United States Patent
Diemer et al.

(10) Patent No.: US 7,977,608 B2
(45) Date of Patent: *Jul. 12, 2011

(54) SURFACE HEATING SYSTEM

(75) Inventors: Michael Diemer, Jönköping (SE); Stephan Diemer, Alsheim (DE)

(73) Assignee: BrainCOM AG, Munich (DE)

( * ) Notice: Subject to any disclaimer, the term of this patent is extended or adjusted under 35 U.S.C. 154(b) by 877 days.

This patent is subject to a terminal disclaimer.

(21) Appl. No.: 11/109,458

(22) Filed: Apr. 18, 2005

(65) Prior Publication Data

US 2005/0225128 A1    Oct. 13, 2005

Related U.S. Application Data

(63) Continuation-in-part of application No. 10/967,664, filed on Oct. 18, 2004, now Pat. No. 7,804,044, and a continuation of application No. PCT/DE03/03515, filed on Oct. 22, 2003, and a continuation-in-part of application No. 10/464,822, filed on Jun. 18, 2003, now Pat. No. 7,250,586, and a continuation of application No. PCT/DE03/01309, filed on Apr. 22, 2003, and a continuation of application No. PCT/DE01/04879, filed on Dec. 21, 2001.

(30) Foreign Application Priority Data

Oct. 23, 2002  (DE) ............................. 202 16 362 U

(51) Int. Cl.
*H05B 3/00* (2006.01)
(52) U.S. Cl. ........ 219/217; 219/527; 219/529; 219/541; 219/543
(58) Field of Classification Search ................. 219/217, 219/527, 529, 541, 543, 212, 528, 549
See application file for complete search history.

(56) References Cited

U.S. PATENT DOCUMENTS 3,768,156 A    10/1973    Caird et al.
(Continued)

FOREIGN PATENT DOCUMENTS

DE    2148191    4/1973
(Continued)

OTHER PUBLICATIONS

International Search Report for PCT/DE2003/003515 filed Oct. 22, 2003 published May 13, 2004.
(Continued)

*Primary Examiner* — Thor S Campbell
(74) *Attorney, Agent, or Firm* — Martin Fleit; Paul D. Bianco; Fleit Gibbons Gutman Bongini & Bianco PL

(57) ABSTRACT

A panel heating system including a support and a heating layer, which contains electrically conductive plastic, with the heating layer configured from a flexible film and the support is flexible. A heatable object is provided, such as, a panel healing system. A method for producing the heating system, in which a heating layer containing electrically conductive plastic is joined to a support. The heating layer is formed by the application of an electrically conductive, in particular expandable or expanded, plastic material to the support, and the subsequent curing of the plastic material on the support. A seat occupancy recognition system is provided that contains elements including electrically conductive plastic. A seat having a seat occupancy recognition system, in addition to a seat occupancy recognition method, according to which a change in the resistance of an electrically conductive plastic material is detected as a result of a weight load on the material.

30 Claims, 8 Drawing Sheets

U.S. PATENT DOCUMENTS

| | | | |
|---|---|---|---|
| 4,032,751 A | 6/1977 | Youtsey et al. | |
| 4,526,952 A | 7/1985 | Zeitler et al. | |
| 4,587,037 A | 5/1986 | Münstedt et al. | |
| 4,636,331 A | 1/1987 | Sako et al. | |
| 4,661,689 A | 4/1987 | Harrison | |
| 4,910,388 A | 3/1990 | Lorenz et al. | |
| 4,966,675 A | 10/1990 | Steininger | |
| 5,111,025 A | 5/1992 | Barma et al. | |
| 5,229,582 A * | 7/1993 | Graham | 219/541 |
| 5,344,696 A | 9/1994 | Hastings et al. | |
| 5,516,189 A | 5/1996 | Ligeras | |
| 5,624,750 A | 4/1997 | Martinez et al. | |
| 5,904,874 A | 5/1999 | Winter | |
| 5,961,869 A | 10/1999 | Irgens | |
| 6,093,910 A | 7/2000 | McClintock et al. | |
| 6,172,344 B1 | 1/2001 | Gordon et al. | |
| 6,194,692 B1 * | 2/2001 | Oberle | 219/543 |
| 6,353,207 B1 | 3/2002 | Burt | |
| 6,423,951 B1 | 7/2002 | Elsasser | |
| 6,541,744 B2 | 4/2003 | Von Arx et al. | |
| 6,906,293 B2 | 6/2005 | Schmiz et al. | |
| 7,053,344 B1 | 5/2006 | Surjan et al. | |
| 2003/0141983 A1 | 7/2003 | Schmiz et al. | |

FOREIGN PATENT DOCUMENTS

| | | |
|---|---|---|
| DE | 2616771 A1 | 4/1976 |
| DE | 2616771 | 11/1976 |
| DE | 3316182 | 11/1984 |
| DE | 3321516 | 12/1984 |
| DE | 3524631 | 1/1986 |
| DE | 8523328 | 11/1986 |
| DE | 8523328.5 | 1/1987 |
| DE | 691 01 703 | 10/1994 |
| DE | 69101703 | 10/1994 |
| DE | 298 08 842 | 9/1998 |
| DE | 29808842 | 9/1998 |
| DE | 19711522 | 10/1998 |
| DE | 197 11 522 | 11/1999 |
| EP | 0057241 | 2/1981 |
| EP | 0057241 | 8/1982 |
| GB | 1246343 | 9/1971 |
| WO | WO 91/11891 | 8/1991 |
| WO | WO 9111891 | 8/1991 |
| WO | WO9518517 | 6/1995 |
| WO | WO 95/18517 | 7/1995 |
| WO | WO 99/66766 | 12/1999 |
| WO | WO 01/89267 | 11/2001 |
| WO | WO 0189267 | 11/2001 |

OTHER PUBLICATIONS

International Search Report for PCT/DE2001/004879 filed Dec. 21, 2001 published Jul. 4, 2002.

English translation of International Preliminary Report on Patentability for PCT/DE2001/004879 filed Dec. 21, 2001 published Jun. 23, 2003.

International Search Report for PCT/DE2003/001309 filed Apr. 4, 2003 published Dec. 31, 2003.

* cited by examiner

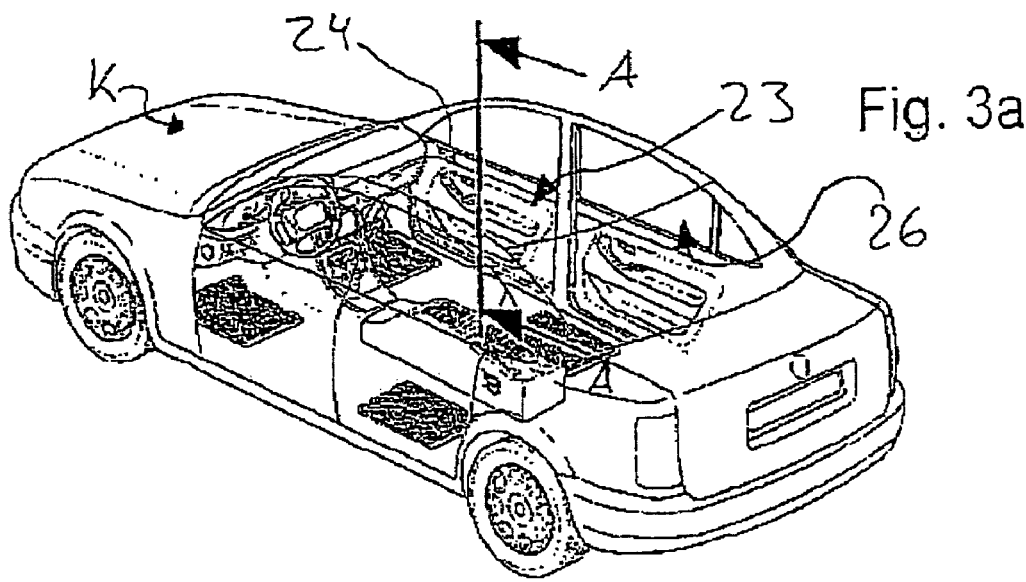
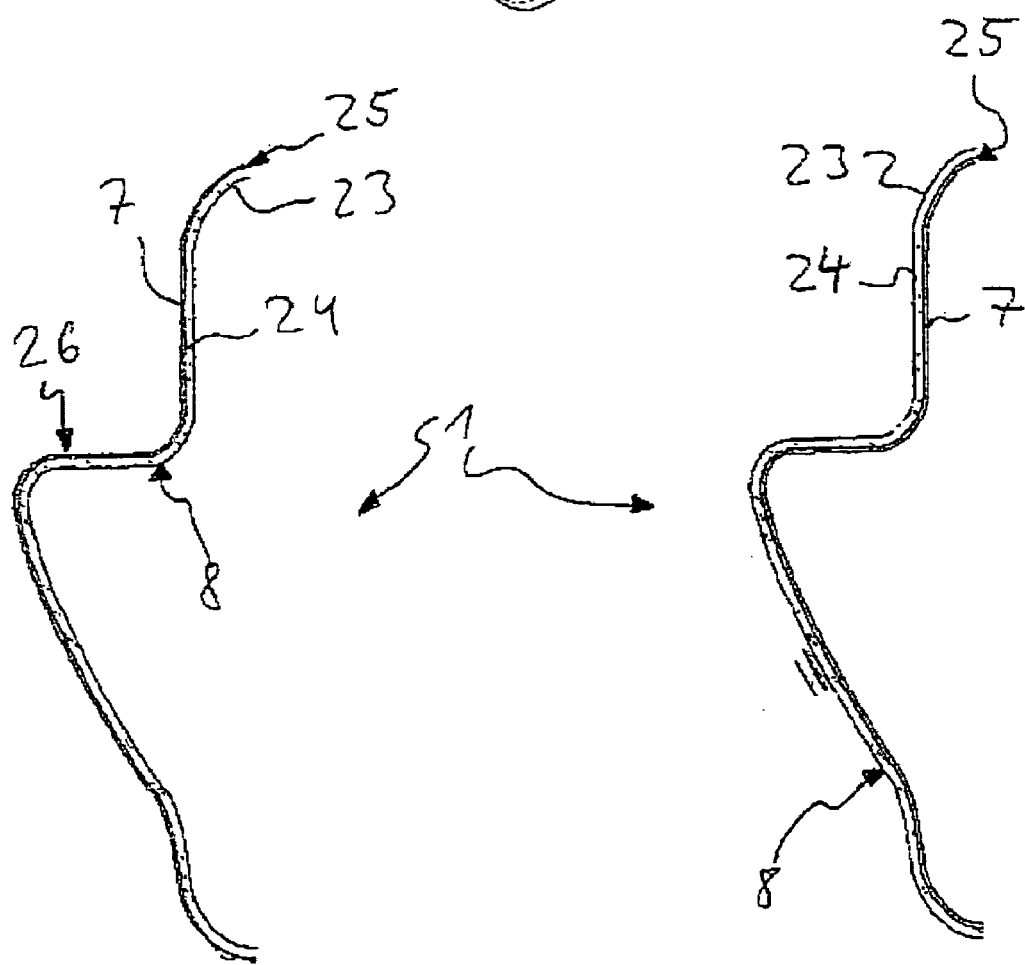
Fig. 3b
Fig. 3c

Fig. 4a
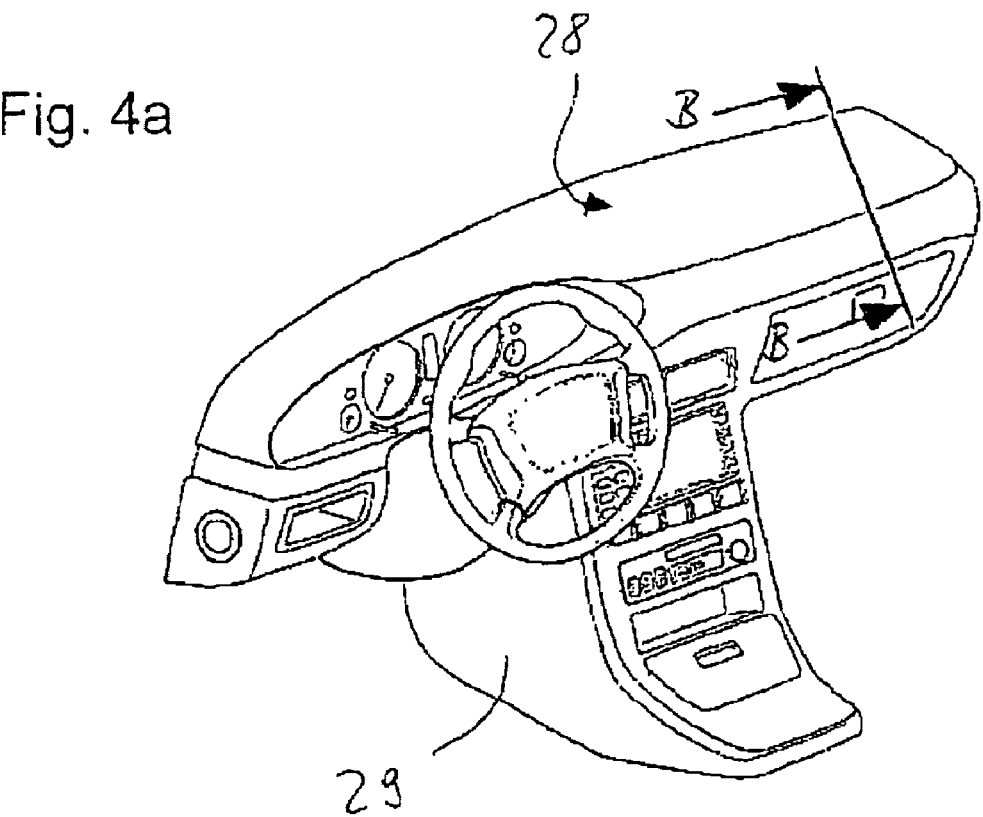
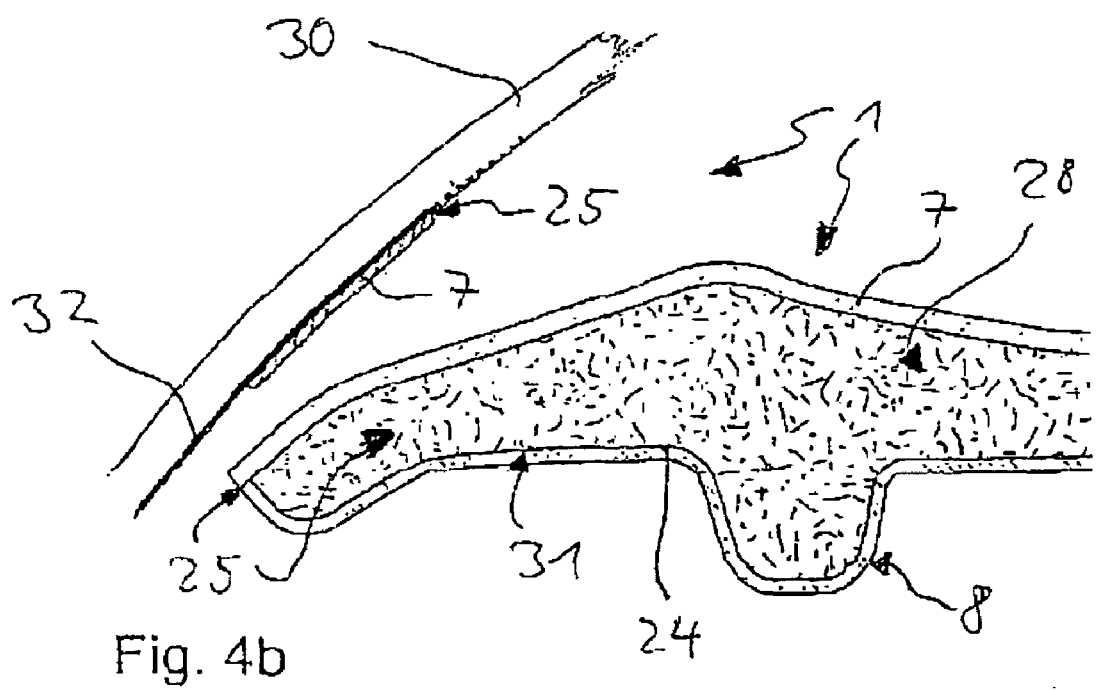
Fig. 4b

SURFACE HEATING SYSTEM

RELATED APPLICATION

This application is a continuation of International Patent Application No. PCT/DE2003/003515, filed on Oct. 22, 2003, the contents of which are here incorporated by reference in their entirety; a continuation-in-part of Ser. No. 10/967,664, filed Oct. 18, 2004; a continuation of International Patent Application No. PCT/DE2003/01309, filed Apr. 22, 2003; a continuation-in-part of Ser. No. 10/464,822, filed Jun. 18, 2003; a continuation of International Patent Application No. PCT/DE2001/04879, filed Dec. 21, 2001, the contents of all of the above are here incorporated by reference in their entirety.

BACKGROUND OF THE INVENTION

1. Field of the Invention

The invention relates to surface heating and a heatable object using it, as well as, a method for production of surface heating. According to another aspect of the present invention, it relates to seat occupancy recognition, a seat using it, as well as, a seat occupancy recognition method, as individual configurations, as well as, in combination with the surface heating, the method for its production and the heatable object.

In particular, the present invention relates to seat heating, a heated seat, as well as, a method for its production. The invention also preferably relates to heating for side panels and floor coverings, especially in vehicles, side panels and floor coverings equipped with it, especially in vehicles, as well as a method for their production. The present invention also relates to, in particular, mattress heating, a heated mattress, as well as, a method for its production.

2. Prior Art

Seat-heating is known for vehicles from practice, which represents surface heating and is formed by current-carrying metal conductors as heating wires, which are arranged between cushion layers. This requires not only a demanding design of a correspondingly equipped seat, but has drawbacks, especially during operation. Because of the stronger heating of surrounding layers in the immediate vicinity of the heating wires, there is the risk of overheating, which can lead to damage of the cushion layers and/or the heating wires, and even cause a fire. In addition, the heat distribution is not optimal over the surface, since the temperature is always higher in the region of the heating wires than at a distance from them. Another drawback of this known design is the mechanical load to which the heating wires are subject when an occupant uses the seat, since the conductor wires may thereby break, which can lead to loss of function and/or result in an additional source of fire.

From DT 26 16 771 A1, a composite heating panel, made of a plastic laminate, with an incorporated semiconducting layer is known, which provides directed radiant heat. This laminate consists of a rigid plastic laminated structure, which is formed from at least one layer of a reinforced substrate basic material and a resin coating on this material, a semiconductive carbonaceous pyropolymer, which is bound to a heat-resistant, inorganic oxide support of large surface area, which is incorporated on at least one side of at least one layer of the substrate material, a heat-reflecting layer, incorporated in a position on one side of the pyropolymer on the substrate material, and power supply devices to parts of the layer made of conductive, carbonaceous pyropolymer, and which produces electrical resistance heating in the laminate, which is reflected and radiated by the heat-reflecting layer of the composite element. Such heating panels will be used as part of a wall of a living room or an office.

In this state of the art, the incorporation of the semiconducting layer into the laminate can take place in that finely comminuted carbonaceous pyropolymer, in the form of small particles or as powder, is mixed with a suitable support or vehicle in such a way that it is applied, spread or otherwise brought to the surface of a resin-coated glass cloth, paper, felt, cardboard, etc., as the laminated substrate or on a wood veneer, which is used in the laminated panel. The finely comminuted carbonaceous pyropolymer can also be mixed with the resin or polymer material, with which a specially reinforcing base material is to be impregnated or which is to be applied on this base material as a coating, wherein this base material is applied in or on the substrate by immersion or coating, and the resulting coated substrate is subjected to a semi-hardening of the type that the semiconductive pyropolymer leads to a uniform impregnation and coating via the resulting semicured, laminated sheet.

DE 33 16 182 A1 discusses the use of molded articles, such as films, plates, or spatially molded structures, from the class of the pyrrole polymers, which are complexed with anions, as electrical heating elements, in particular, for the heating of corrosive liquids or gases. The molded articles can also be coated with organic plastics.

A polymeric composite heating element is described in DE 35 24 631 A1 and has the form of a film, tube, or rod. Such polymeric composite heating elements can be used as such as heating sources, or can be laminated with conventional plastic films in order to improve the material strength.

The use and production of electrically conductive thermoplastic polyurethanes are known from DE 33 21 516 A1. Corresponding products are suitable for, among other things, the production of 1- to 2-mm-thick films for surface heating elements.

Thus, heating devices with electrically conductive plastic are rudimentarily known, but the entire state of the art does not contain any data or suggestion concerning how such heating devices are to be equipped and produced so that they can be used in actual practice.

In a number of other publications of International Patent Class H05B 3/36 and 3/84, surface heating is explained on the basis of examples of external mirrors for vehicles, which contain a layer of electrically conductive plastic. Three films of electrically conducting plastic are used on essentially rigid supports. Use of a film of electrically conducting plastics on the support structure of the vehicle seat is not possible, however, since the entire overlying cushion layers, etc., must then be heated in order for the heat to reach a seated occupant, which would be a considerable waste of energy.

No usable surface heating with electrically conducting plastics is known, especially for seat or couch substrates. For vehicle seats or mattresses, e.g., however, simple, cost-effective and operationally reliable heaters would be desirable.

SUMMARY OF THE INVENTION

It is therefore an objective of the present invention to devise, with the least possible expense, a surface heating with electrically conducting plastic, as well as an object with it.

This objective is realized by novel surface heating, a novel heatable object and a novel method for production of surface heating according to the following detailed description of the invention.

A good, simple and operationally reliable design, as well as, good heat distribution, are made possible with the invention as additional advantages.

According to the invention, surface heating is generated with a support and a heating layer containing electrically conducting plastic, in which the heating layer is formed by a flexible film and the support is flexible.

Such surface heating is modified in the context of the present invention, in that the support is a layer, especially a woven or nonwoven fabric, preferably a natural or synthetic nonwoven fabric. As an alternative, the support can be a molded article from an elastic material, for example, a seat cushion of a flat part of a seat or a seat back, or a mattress.

Preferably, the heating layer contains polyurethane, single-component polyurethane, crosslinked single-component urethane, a PU foam, UV-resistant and/or hydrolyzable or vapor-permeable plastic material. However, other electrically conducting or conductive, foaming and foamed materials can also be used, where plastic materials are preferred. Alternatively or additionally, it is preferred that the electrically conducting plastic of the heating layer contain graphite, preferably in powdered form.

In surface heating, it can also be prescribed that contact ends of current-supply wires in the heating layer or between the support and the heating layer be in contact with the latter. The contact ends of the current-supply wires are then preferably fastened to the latter by means of the heating layer itself or stitched or glued to the heating layer and/or the support.

It is also advantageously prescribed that the heating layer be directly formed by spraying, rolling or spreading directly onto the support. Alternatively, the heating layer can be stitched to, or glued or sealed onto the support or fastened to it in some other way.

A manually and/or electrically/electronically operable and/or automatic current control is also advantageously provided, which can be connected to a current source, and to which the current-supply wires are connected, whose contact ends are in contact with the heating layer.

A heatable object that contains surface heating according to the aforementioned embodiments is also devised by the invention.

In the context of a preferred embodiment, the object is a seat surface part or a seat back or cushion of a seat or couch, especially a mattress, and the heating layer is anatomically adapted to the thigh-buttocks area or parts of the back of the user. This is advantageously effected by automatically shaping the heating layer in the plane of the seat surface part or the seat back or the cushion of a seat or couch, especially a mattress, in which it is merely present or electrically conducting according to anatomical specifications. Alternatively or additionally, the heating layer can have a corresponding thickness profile for the anatomically adjusted release of heat.

Another preferred embodiment of the heatable object consists of a cushioned panel, especially in a vehicle. Such a heatable object can also be designed for a different heat release over its surface.

In general, it can also be prescribed that the heating layer be profiled for a different heat release over its surface in its surface propagation and/or thickness.

Finally, the present invention also provides a method for production of surface heating, in which a heating layer is connected to an electrically conducting plastic with a support. According to the invention, the heating layer is formed by initially applying an electrically conducting, especially foamed or foam-plastic material, onto the support, and then curing the plastic material on the support. A preferred further development of this method consists of the fact that before application of the electrically conducting, especially foamed or foam-plastic material, onto the support, the contact ends of the current-supply wires are initially arranged on the side of the support, on which the plastic material is then applied.

Alternatively, in a method according to the invention for production of surface heating in which a heating layer with electrically conducting plastic is connected to a support, it is prescribed that the heating layer be produced from an electrically conducting, especially foamed or foam-plastic material, and then arranged on the support. The heating layer, after arrangement on the support, can then be preferably joined to the latter, without sliding. This preferably occurs by way of the heating layer being stitched, glued or sealed to the support.

Preferably, but without restriction, electrically conducting polyurethane is used as the plastic material.

The method can be modified in that the contact ends of the current-supply wires are applied to the heating layer and/or to the support, so that they are in contact in the combined support and heating layer with the latter. For this purpose, the contact ends of the current-supply wires are stitched or glued to the heating layer and/or support.

Another modification of the method according to the invention consists of the fact that the heating layer is profiled during or after its production in its surface shape and/or thickness. This can occur directly during production of the heating layer on the support, for example, by means of templates that determine the surface shape of the heating layer. If the heating layer is produced separately, i.e., not directly on the support, its shape can be obtained, for example, in shaping frames or by punching. The thickness can also be varied over the surface of the heating layer.

Preferred and advantageous refinements are apparent from the dependent claims and their combinations, as well as from the entire disclosure contents of these documents, involving expert knowledge and the prior art, especially to the extent stated in the introduction of this description.

For example, the electrically conducting plastic material of the heating layer can contain carbon or carbon particles, in order to furnish electrical conductivity. In addition, the material of the heating layer is such that during or after a temperature increase, as a result of the effect of heat, it is at least essentially cured, and also shape-stable and remains undamaged. Polyurethane (PU), as already mentioned, is preferably used for the electrically conducting plastic, but, in principle, all other materials disclosed in the prior art mentioned in the introduction can also be used, if they can be foamed. Additional material details and technical background are disclosed, for example, in the publications DE G 85 23 328.5, DE 298 08 842 U1, DE 197 11 522 A1 and DE 691 01 703 T2, whose contents are included fully in the present documents as references in order to avoid repetition.

According to another aspect of the present invention, it concerns a seat occupancy recognition and, with it as well, a seat occupancy recognition method, as described herein in detail in the following. This aspect, in its individual embodiments, is relevant to the invention and disclosed in it, both on its own and in combination with the first aspect of the invention, i.e., surface heating, the method for its production and the heatable object. In principle, the embodiment, materials and production methods for the seat occupancy recognition are consistent with the embodiment, materials and production method for the seat heating, as described above and elsewhere in the present document, in which the same or similar effects and advantages are also obtained.

BRIEF DESCRIPTION OF THE DRAWINGS

The invention is explained in more detail below with reference to embodiment examples, which are indicated in the drawings, where:

FIGS. 3a, b, and c show second and a third embodiment examples of a surface heating system, in accordance with the invention, schematically, in a perspective overview representation or a sectional view, in combination with an inside cover of a motor vehicle;

FIGS. 4a and 4b schematically show an inside cover of a motor vehicle as a fourth embodiment example of a surface heating system in a perspective overview representation or a sectional view;

DETAILED DESCRIPTION OF PREFERRED EMBODIMENTS OF THE INVENTION

In the following description of the invention, with the aid of embodiment examples, the same reference symbols are used throughout for the same or similarly acting parts. Even if not all details of the graphic representations are discussed in the following description, the individual features and their connections can be readily deduced by an expert in the field from the figures themselves, if they are represented in the figures.

Figure 1A:
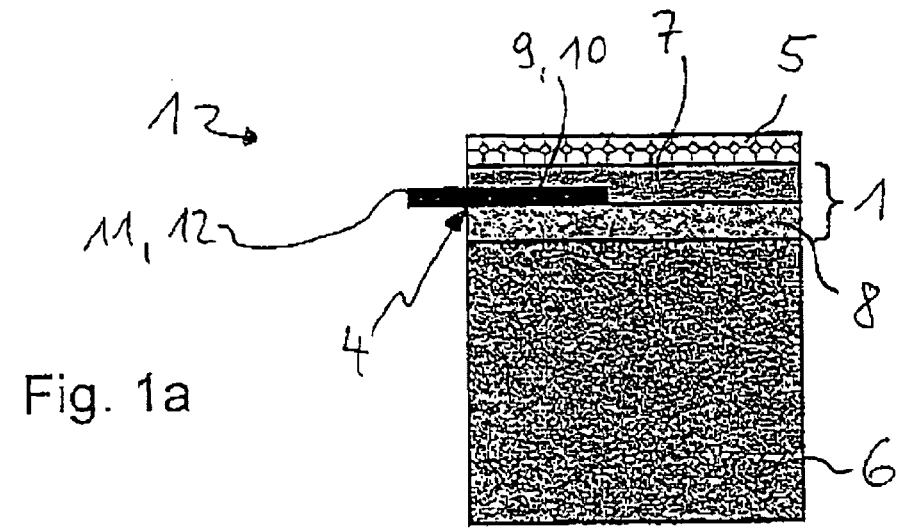
FIGS. 1a and b schematically show in a sectional or perspective, partial view, a first embodiment example of the invention in connection with a motor vehicle seat with a seat heating.
Figure 1B:
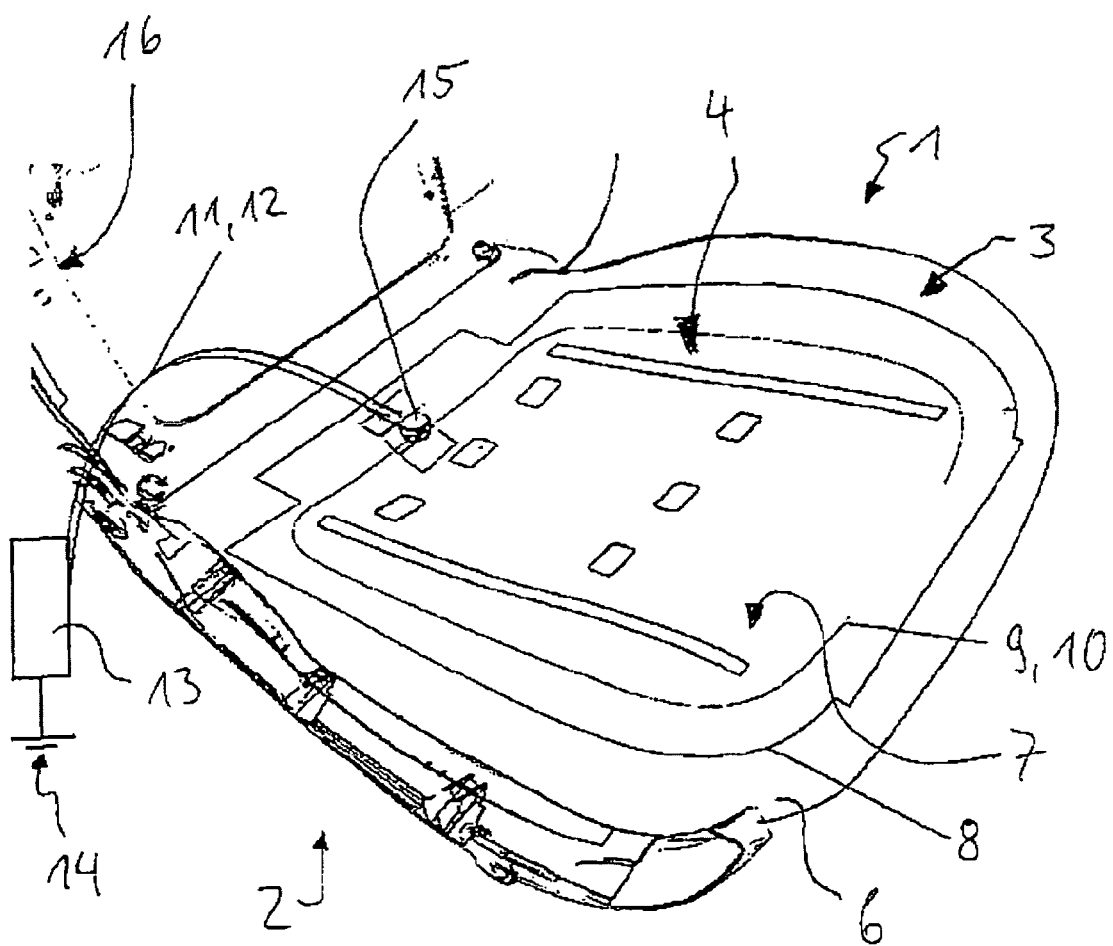

As a first embodiment example of a surface heating system 1, a motor vehicle seat 2, with a seat heating system 4 integrated in its seat surface part 3, is shown in FIGS. 1a and 1b in a sectional or perspective schematic drawing.

The structure of the seat surface part 3 in the vicinity of the surface heating system 1 is shown in FIG. 1a, in which a cross-sectional part through the corresponding layers/components of the seat surface part 3 is shown. The surface of the seat surface part 3 is formed by a seat cover 5, which can be made of fabric, synthetic leather, or leather or other suitable materials or combinations thereof. The form of the seat surface part 3 is formed, at least essentially, by an elastic foam molded article 6. The components of the seat heating system 4 are placed between the elastic foam molded article 6 and the seat cover 5.

The seat heating system 4 is formed by the surface heating system 1, which contains a heating layer 7 and a support 8. The support 8 is a flexible layer made of a fibrous nonwoven fabric with natural and/or synthetic fibers. The heating layer 7 is made of a flexible, electrically conducting synthetic foam, such as electrically conductive polyurethane, from which a film or a foil is formed, so that a surface skin is produced. The film does not have any recognizable pores but can also be closed-cell or closed-porous in its structure. In particular, the material is UV-resistant and/or hydrolyzable or vapor-permeable, so as to be used in a seat or flat piece of furniture upholstery, in accordance with the most preferred use. In this way, an optimal acclimatization through the substrate is secured for the user.

The material for the formation of the film, such as UV-resistant and hydrolyzable or vapor-permeable, cross-linked single-component polyurethane, is, for example, applied by spraying on the fibrous nonwoven fabric so that a so-called spray flush [sic] or a spray skin is formed by this so-called spray flush method. As an alternative, the film could also be formed on the seat cover 5 or the elastic foam-molded article 6 by this method. The material could be sprayed also into the foam mold for the elastic foam-molded article 6, before the introduction of the foam material for it, so as to bond with the latter during its hardening. During a production of the film by spraying, it is possible, for example, to adjust the thickness of the film very precisely by the duration of the spraying, and the thickness can be optionally varied over its course. Alternately, the film can also be produced by rolling or spreading the corresponding material, in particular on the support 7, but also separately, and then optionally can be bonded to the support 7, the seat cover 5, or the elastic foam-molded article 6.

Contact ends 9 and 10 of the power supply wires 11 or 12 are placed at the edge of the heating layer 7, between the heating layer 7 and the support 8 in such a way that they are in electrically conducting contact with the heating layer 7 (see also FIG. 1b).

For the production of the surface heating system 1 of the first embodiment, still-flowable or liquid electrically conductive polyurethane material, which, for example, contains carbon particles, is applied, as previously explained in more detail, by rolling, spreading, or spraying on the fibrous nonwoven fabric of the support 8, after the contact ends 9 and 10 of the power supply wires 11 or 12 were suitably placed on the fibrous nonwoven fabric of the support 8. After hardening of the electrically conductive polyurethane foam, it is flexible and in electrically conductive contact with the contact ends 9 and 10 of the power supply wires 11 and 12 and forms the heating layer 7. The contact ends 9 and 10 of the power supply wires 11 and 12 can be held alone inherently by the bond forces between the polyurethane foam and the fibrous nonwoven fabric. For further securing the attachment, the contact ends 9 and 10 of the power supply wires 11 and 12 can still be sewed together with the composite (not shown). In this variant, the electrically conductive PU layer of the heating layer 7 at the same time also represents an adhesive or glue layer.

Instead of forming the heating layer 7 directly on the fibrous nonwoven fabric of the support 8, the heating layer 7 can also be formed separately and be brought together with the support 8 in the cured but flexible state. The attachment between the heating layer 7 and the support 8 is effected, for example, by cementing, sewing, or soldering, depending on which process can be applied as a function of the materials used. It is not mandatory for the contact ends 9 and 10 of the power supply wires 11 and 12 to lie between the support 8 and the heating layer 7, but rather they can also be brought together with the heating layer 7 on the side of the heating layer facing away from the support 8 in order to obtain an electrically conductive contact.

The fibrous nonwoven fabric of the support 8 can also be a tape material at first, on which the heating layer 7 is formed, shaped on the full surface or according to the configuration required for the seat surface part, or on which the prefabricated heating layer 7 is also placed as a tape material or parts shaped according to the configuration required for the seat surface part 3, and bonded with it. Subsequently, the desired individual pieces can be produced according to the configuration required for the seat surface part 3 by punching out, for example. However, it is also possible to produce the fibrous nonwoven fabric first in the configuration required for the seat surface part 3 and to form the heating layer 7 on it, which can also be prefabricated beforehand, according to the configuration required for the seat surface part 3. The contact ends 9 and 10 of the power supply wires 11 and 12 can be inserted in a correspondingly suitable way during production of the composite of the support 8 and the heating layer 7, or placed on the composite that is at least joined together for a suitable attachment.

In FIG. 1b, the first embodiment of the surface heating system 1 is further illustrated in a schematic oblique view, omitting the seat cover 5. The path of the contact ends 9 and 10 of the power supply wires 11 and 12 can be easily seen. Furthermore, a current control 13 and a current source 14 for the control or operation of the surface heating system 1 are schematically shown. The current control 13 can be actuated manually and/or electrically/electronically and/or be automatic. In actual practice, the current control 13 is the normal control for heating up the motor vehicle space or a part thereof, or a separate control. The power supply wires 11 and 12 are connected to the current control 13 and end, more or less, in their respective contact ends 9 and 10. Ahead of the contact ends 9 and 10, a functional unit 15, for example, can also be provided in the power supply wires 11 and 12, which can involve, for example, a separate seat occupancy sensor, a heat sensor or temperature probe, a distributor, and many other things.

The support 8 could also be formed by other materials and structures, such as a woven fabric, instead of a fibrous nonwoven fabric. The support 8 could also be a molded article, however, such as, for example, the elastic foam-molded article 6 itself from the first embodiment according to FIGS. 1a and 1b.

Suitable materials for the heating layer—that is, the electrically conductive foam material—are specified in the cited documents, in particular with regard to their physical characteristics, and moreover they are well known to technical experts and are also indicated, for example, in the prior art referenced in the cited documents. It is therefore unnecessary to discuss them in more detail, but rather they are included herein by reference to all suitable materials, in particular from the older publications, indicated or referenced in the cited documents.

Although it is not explained in the preceding and it is also not shown in FIG. 1b, the reclining piece of furniture 16 that is only partially visible in FIG. 1b can also be equipped with a surface heating system 1. Furthermore, all similar objects, such as mattresses or other upholstery in particular, can be equipped with a surface heating system 1 according to the invention. Also, use of the invention with side linings and floor covers, especially in motor vehicles, is preferred.

Figure 2A:
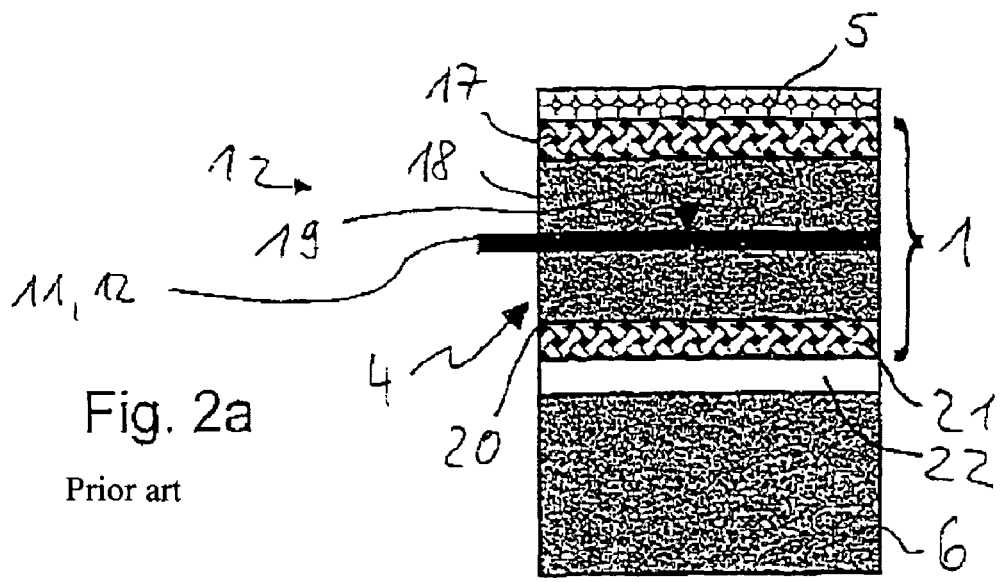
FIGS. 2a and b schematically show in a sectional or perspective, partial view, a motor vehicle seat with a seat heating according to the state of the art.
Figure 2B:
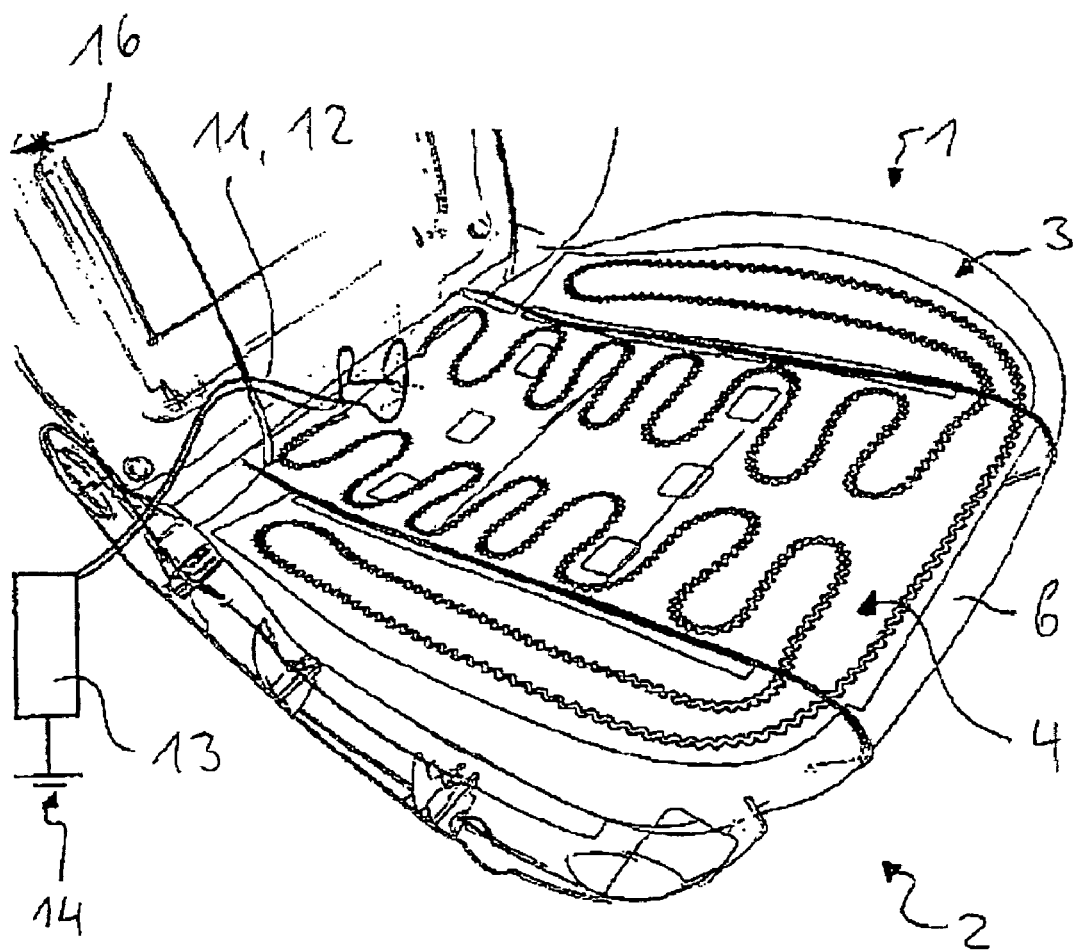

FIGS. 2a and 2b show representations analogous to FIGS. 1a and 1b merely to illustrate the differences between the present invention and the prior art. This previously known surface heating system 1, in the form of a seat heating system 4 for a motor vehicle seat 2, has the seat cover 5 and an elastic foam-molded body 6 in the usual manner, with the surface heating system 1 lying between them.

As clarified by FIG. 2a and considered in order starting from the seat cover 5, the surface heating system 1 in the prior art has an upper fabric layer 17, an upper foam layer 18, a heating wire layer 19, a lower foam layer 20, and a lower fabric layer 21, which are bonded, as a prefabricated composite and by means of an adhesive tape 22 adhering on both sides, in at least a slip-resistant manner with the foam-molded article 6 that forms the actual seat cushion.

In the production of this surface heating system according to the prior art, the fabric layers 17 and 21 are first bonded with the immediately adjacent foam layers 18 or 20 using a flame laminating method.

Embodiments of heating devices in motor vehicles are also shown in FIGS. 3a, 3b, and 3c, 4a and 4b, and 5a and 5b.

FIG. 3a shows a motor vehicle K in a sectional drawing, in which, a cutting plane A through an inside cover 23 of a motor vehicle door 24 is shown schematically. The schematic sectional view of the inside cover 23 in the cutting plane A, according to the arrows shown in FIG. 3a, is shown as a second embodiment example of a heatable object with a surface heating system 2 in FIG. 3b. This inside cover 23 contains, as a support 8, a support layer 24, on which the heating layer 7 containing electrically conductive plastic is applied by means of an adhesive agent 25. Since the visible surface of the inside cover 23 is formed by the heating layer 7 containing electrically conductive plastic, the free visible side 26 of the heating layer 7 containing electrically conductive plastic can be provided with a decoration (not shown), for example, a synthetic leather-like appearance, so as to attain a pleasant exterior of the inside cover 23.

As an alternative to the embodiment example described in the preceding, it is possible to place the heating layer 7 containing electrically conductive plastic on the side of the support layer 24, turned away from the inside space 26 of the motor vehicle K, by means of the adhesive agent 25, in a variant of the embodiment, which is shown in a sectional view in FIG. 3c. In such a case, either the support layer 24 itself can be provided with a decoration (not shown) on its visible side or a decoration 27 (only partially visible for better clarity) can be placed on the visible side of the support layer 24.

The principle of the two embodiment examples just described can also be applied to the entire passenger space 26 of the motor vehicle K, especially if the corresponding parts are upholstered. For example, motor vehicle seats can be used to implement or support a seat-heating system, a roof cover, rear window shelf, column covers, consoles, steering wheel, carpeting, air ducts, especially inside for the preferred preheating of cold air, and many others, as heatable objects with heating devices which contain a heating layer 7 containing electrically conductive plastic, to improve the climate of the passenger space of a motor vehicle. In this way, it is not only possible to design conventional heating units smaller, but also a quicker and more uniformly distributed and intentional heating of the entire inside space 26 of a motor vehicle K can also be effected. Other concrete embodiment examples for this are clarified in FIGS. 4a and 4b and 5a and 5b.

FIG. 4a shows the position of a cutting plane B in a perspective view of a dashboard 28 and a console 29, wherein the line of sight to the cutting plane is illustrated by arrows according to the representation in FIG. 4b. FIG. 4b is the sectional view through the dashboard 28 in the cutting plane B, wherein a part of an adjacent windshield 30 of the correspondingly equipped motor vehicle K is also shown in a sectional view. The heating layer 7 containing electrically conductive plastic forms the plastic skin, with which the dashboard 28 is covered and which forms its surface. By means of an adhesive agent 25, which is formed, in the fourth embodiment example under consideration, by a filling material, such as foam etc., the heating layer 7 containing electrically conductive plastic is bonded to a support layer 24, used as a holder 31, as a support 8. The heating layer 7 containing electrically conductive plastic thereby forms a skin with embedded conductive material. As an alternative, the heating layer 7 containing electrically conductive plastic could also be covered with a decoration layer (not shown), in this embodiment example, approximately analogous to the variant which is shown in FIG. 3c.

FIG. 4b partially shows, in a sectional view, a windshield 30 as another embodiment example of an object with a surface heating system 1. This windshield 30 is provided with a black ceramic layer 32 in the area of its circumference, which, for example, can be applied by silk screening. Furthermore, a heating layer 7 containing electrically conductive plastic is placed in the area of the ceramic layer 32, directly by means of an adhesive agent 25, such as a glue, on the windshield 30. This embodiment can, for example, implement a surrounding, additional, and/or separate heating of the windshield 30 for the prevention of the formation of fog or to remove fog, or to deice. Furthermore, such a surface heating system 1 can be provided, in particular, in the area of the rest position of windshield wiper blades (not shown), in order to implement here an additional and/or separate heating of the windshield 30, so that damage to solidly frozen windshield blades (not shown) can be avoided when the windshield wiper (not shown) is actuated.

If the heating layer 7 containing electrically conductive plastic is made of transparent material, a transparent area of a glass panel, such as a windshield 30, can also be provided with a corresponding surface heating system 1. In this way, the fog on a glass panel thus equipped can also be removed or prevented and also ice can be thawed. The heating conductors used previously, for example, with rear windows (not shown), could then be omitted or made smaller.

Figure 5A:
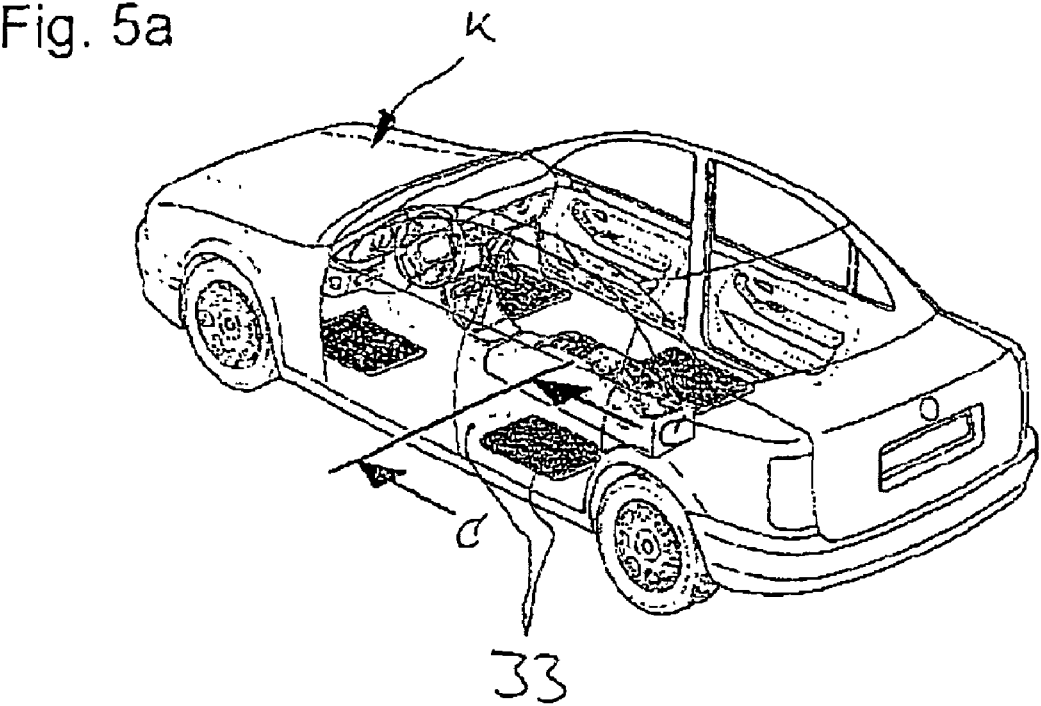
FIGS. 5a and 5b schematically show a fifth embodiment example of an object with a surface heating system in a perspective overview representation or a sectional view in the form of a floor cover of a motor vehicle.
Figure 5B:
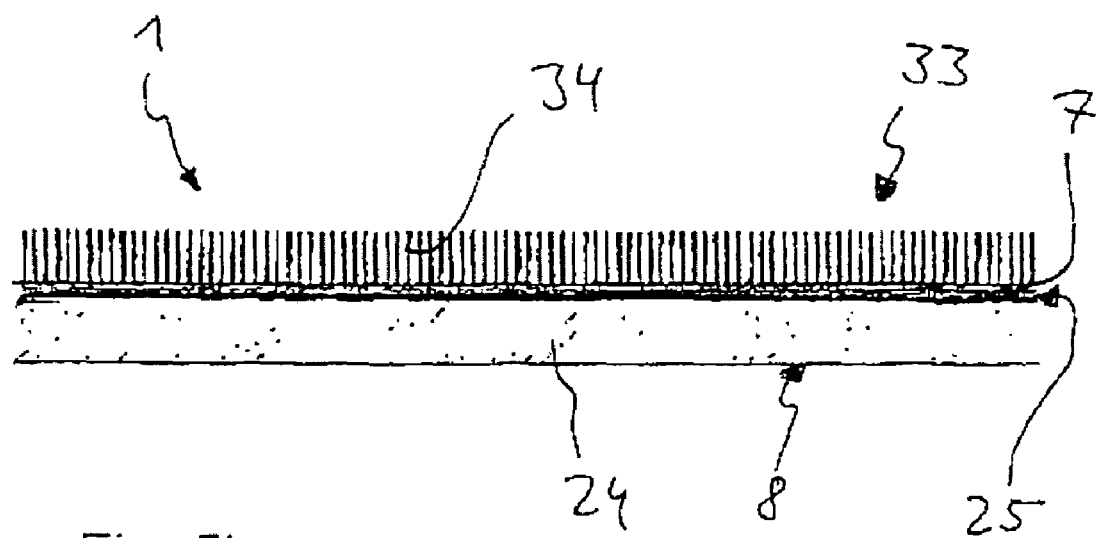

As another variant for the inside space heating of a motor vehicle K, the designing of carpet material 33 with a surface heating system 1 is clarified in FIGS. 5a and 5b. In this sixth embodiment example, which is clarified in a partial sectional view in FIG. 5b, which can be seen on cutting plane C in FIG. 5a in accordance with the arrow direction, the structure of such a carpet material 33 is shown. The heating layer 7 containing electrically conductive plastic is bonded to a lower support layer 24 as a support 8 by means of the adhesive agent 25.

The filaments, loops, or general fibers/threads 34, which form the upper side of the carpet material 33, can thereby be affixed on the support layer 24 and go through the heating layer 7 containing electrically conductive plastic, placed directly only on the layer containing electrically conductive plastic, or proceed from a separate layer (not shown), which is bonded to the heating layer 7 containing electrically conductive plastic by means of an adhesive agent 25. In the latter case, the support layer 24 can also be omitted, and the support 8 can be formed by such a separate layer (not shown).

Within the framework of the present invention, it is possible also for the heating layer 7 containing electrically conductive plastic to be formed directly by the support layer 24, or for the heating layer 7 containing electrically conductive plastic to be affixed to the support layer 24 by means of the filaments, loops, fibers, or threads 34, which form the upper side of the carpet material 33. Furthermore, it is possible to place the heating layer 7 containing electrically conductive plastic on the underside of the support layer 24, using an adhesive agent 25, so that conventional carpet material 33 can still be made in the usual manner and subsequently can be provided with the surface heating system 1. It is thus also possible to equip already present carpet material 33 with a surface heating system 1.

As already mentioned, it is possible to realize a desired heating or warming effect with the corresponding heated objects by connecting the heating layer 7 containing the electrically conductive plastic material to a power supply (not shown). Since the electrical resistance of the heating layer 7 is constant, the heating temperature can be determined or regulated by the supplied electric power. In an advantageous manner, the possibility exists of using both DC and AC, particularly without the generation of smog. Since such generated heat is also exclusively radiant heat, a certain temperature and heating comfort is produced.

When using natural raw materials, such as wood fibers, sisal, material from banana trees, coconut fibers, etc., an odor formation in wet weather and bacterial infestation often present great problems. If, as in the previously described embodiment examples, inside coating parts are designed so that they can be heated, an avoidance of such an odor formation and bacterial infestation can also be achieved in combination with the purely heating effect.

Other concrete examples for heatable objects with a surface heating system 1, according to the present invention, include, for example, a diesel tank made of plastic, wherein a thickening of diesel fuel at low outside temperatures can be avoided in that a minimum temperature can be maintained; an oil sump, which can be used for the preheating of motor oil for the better and more efficient operation of the engine; an entire engine space, which makes possible a preheating of the engine; and, for example, a loading space both in private automobiles as well as freight vehicles. In this way, surface heating system 1 can be used advantageously in the interior space and in the outside areas of motor vehicles.

The present invention, however, is not limited to use in the area of motor vehicles. All previously mentioned embodiment examples and variants and analogous uses can also be used, for example, with vehicles with two wheels, in the railroad area, with ships and airplanes.

As already mentioned, numerous other application areas of the present invention are possible, thus, for example: motorcycles and mopeds, and the like, benches and service elements can be equipped with a corresponding surface heating system. Other application possibilities exist, for example, in the household (coating of plastic wallpaper, wood covers, wood floors, carpets, tiles, sheathings for heating and water pipes, floor heatings), with clothing and the like (shoes, boots, ski boots, work clothes, protective clothing, gloves, electric blankets, heating covers, for example, in the clinical area, heating containers), in sports and leisure (artificial turf playing fields, the underside of tents, sleeping supports in tents), and in the military (among other applications, preheating in a motor vehicle so that the engine will start better in the winter).

With regard to the production of a surface heating system or an object in accordance with the invention, it is thus preferred if the layer be produced with or from electrically conductive plastic in a spray or immersion method or by roller application. A corresponding coating is preferably provided during a method for the production of a heating device or an object with it. In this way, the invention makes possible, in particular, an adaptation or selection of the coating method also with respect to the configuration of the form to be coated and/or the number of units to be produced.

In the example and comparable embodiments discussed in the preceding, the layer thickness of the electrically conducting layer is preferably between approximately 0.05 mm and about 0.3 mm. If the electrically conducting layer is also to fulfill a function as a visible surface, it is preferable that the thickness be greater. In particular, it is also possible, within the scope of the present invention, to adapt the layer thickness as a function of the requirement or the requirement profile to the heating device or the requirements of the heating device or to the object or the requirements of the object, which can be easily determined by a careful consideration or by conducting experiments. For example, a layer thickness of 1.2 mm is provided if a surface layer with an additional function is involved, such as the inside cover of a vehicle.

As already indicated, especially preferred specifications for the plastic material of the heating layer 7 are that it contain or be made of polyurethane, preferably cross-linked and/or single-component polyurethane, which, in particular, is UV-resistant and hydrolyzable or vapor-permeable.

A variant in which, simultaneously with the heating of a seat with the placement of the surface heating system 1, an especially weight-dependent seat occupancy recognition is implemented in regard to a particular specialty of the present invention. Such seat occupancy recognitions must currently be implemented separately, so as to carry out, for example, the triggering of an airbag in the case of an accident, only if one passenger sits on a corresponding seat. By the combined implementation of the surface heating system 1 according to the present invention and the simultaneous function of seat occupancy recognition, which can also provide weight-dependent information, so as to accordingly and eventually control the type and frequency of airbag triggering, not only is there a savings in production expenditure, but also in volume and weight in or on the vehicle, in those places where such savings are not otherwise required for the stability and safety of the vehicle.

Figure 6:
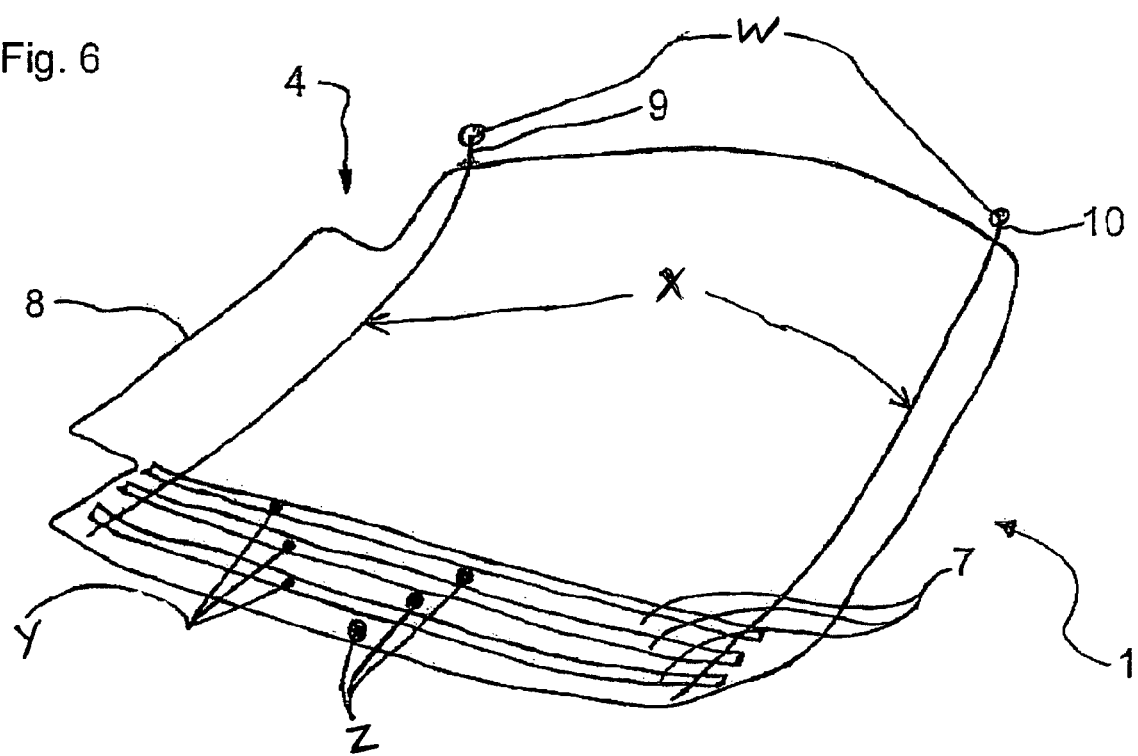
FIG. 6 schematically shows a sixth embodiment example of the invention in a perspective partial view of a motor vehicle seat with a seat heating.

The surface heating system 1 contains, in particular, a strip-like heating layer 7 containing electrically conductive plastic, as is illustrated schematically in FIG. 6. Moreover, all features in accordance with the design according to FIGS. 1a and 1b can be combined with the embodiment example under consideration and are understandable to any expert in the field, so that corresponding descriptions can be omitted here. W indicates the electrical system; X indicates the current supply within the heating mat; y indicates that the wires 7 are uncoated; and Z indicates that they are coated.

Although not separately shown in the drawing, one essential application of the present invention is a mattress with a surface heating system in accordance with the invention. In comparison with the prior art, in which there is a so-called electric blanket with metal resistance heating wires, a mattress designed in that way has the advantage that the operating safety is at least substantially improved. With the surface heating system according to the present invention, it is not possible for a fire to occur. In the case of damage to the heating layer, which can also be formed in the shape of strips also, no sparks are produced, as with metal conductors.

Likewise, in the preceding, particularly in connection with the first embodiment example, it was already explained that the heating layer 7 is a film or a foil. Preferably, a paint-like polyurethane layer or a polyurethane paint layer with the indicated physical properties, especially an application of carbon black is used to effect electrical conductivity. Furthermore, it is preferred that a single-component polyurethane material and/or an application of carbon black be used to impart electrical conductivity.

A preferred thickness of the heating layer 7 is from about 0.3 mm to approximately 0.5 mm.

Instead of the spray application of the electrically conductive plastic material on the support, already shown in more detail above, a rolling method can also be used, for example. Liquid polyurethane, for example, is applied on a roller and released on a substrate, such as the support or an external substrate. The distance of the roller circumferential surface from the substrate determines the thickness of the heating layer. After the solidification or curing of the polyurethane, a paint film with the desired properties is once again obtained, wherein shaping measures on the film, including cutting, can be carried out during or after the roller application as was explained above.

If the heating layer is produced, optionally on the support, by a suitable method, then subsequently, the heating layer can optionally be bonded, alone or already together with the support, or, for example, a molded article or a cover, by sewing, bonding, with a Velcro strip, etc., which was also already discussed above.

The surface heating system can be operated with DC or AC, wherein the response behavior is better with DC operation.

Other advantages of the surface heating system in accordance with the invention, in comparison with earlier systems with metal heating wires and in addition to the cost advantage, are to be found in the uniform heating behavior and in the lower current consumption, in comparison, for example, to previous conventional seat heating systems with metal heating wires, as a corresponding series of experiments shows.

A seat heating system, which is commonly sold on the market, from the Bauerhin Company (Model S4300), was compared with a surface heating system in accordance with the invention, with a heating mat made of electrically conductive plastic. The seating surface and the reclining seat back could be controlled separately. The heating mat was hooked in via the head rest on the seat above and affixed on the border by an adhesive tape.

The measurements should give information on the heating behavior and the current consumption of the two seat heating systems. The goal of the experiment was specific: to measure the heating times with the corresponding current consumption for the two models. To this end, a DC voltage of 12 V was applied to the connecting terminals of both heating units. The current consumed was measured by means of a current detection device integrated with the power supply. At intervals of 1 min, the temperature and current were measured. A comparison between the two heating units was carried by means of the current consumed by the seat.

| Heating mat made of conductive plastic Temperature in ° C.* | Current in A | Time in min | Heating S4300 Bauerhin Company Temperature in ° C. | Current in A |
| --- | --- | --- | --- | --- |
| 21,4 | 7,4 | 0 | 22,4 | 0,0 |
| 26,0 | 7,1 | 1 | 24,1 | 7,8 |
| 30,4 | 6,8 | 2 | 26,9 | 7,7 |
| 36,0 | 6,7 | 3 | 28,8 | 7,7 |
| 37,0 | 6,6 | 4 | 30,3 | 7,6 |
| 7,0 | 6,6 | 5 | 31,1 | 7,6 |
| 39,1 | 6,5 | 6 | 31,3 | 7,6 |
| 40,3 | 6,5 | 7 | 32,5 | 7,6 |
| 41,4 | 6,5 | 8 | 33,0 | 7,6 |
| 42,1 | 6,5 | 9 | 34,0 | 7,6 |
| 42,6 | 6,5 | 10 | 34,4 | 7,9 |
| 43,1 | 6,5 | 11 | 34,7 | 7,6 |
| 43,7 | 6,5 | 12 | 35,0 | 7,7 |
| 44,4 | 6,5 | 13 | 35,4 | 8,0 |
| 44,7 | 6,5 | 14 | 35,8 | 8,0 |
| 45,1 | 6,5 | 15 | 35,6 | 7,6 |
| 46,0 | 6,4 | 25 | 36,0 | 7,6 |
| 48,1 | 6,6 | 50 | 36,1 | 7,7 |

*Commas in the table designate decimal points.

The temperature measurement point was, more or less, at the center of the seat surface with the heating mat of the surface heating system, in accordance with the invention, with the heating layer containing electrically conductive plastic. With the unit according to the conventional model with metal heating wires, the temperature measurement point was approximately 0.5 cm next to a heating wire. The temperature measured on the heating wire itself was 50° C. after 25 min. This temperature is required to realize a surface effect. Considerable problems are connected with this in actual practice, however, in that, for example, the wire can burn out or the seat cover can ignite as a result of excessively high temperatures. These problems are eliminated with the surface heating system in accordance with the invention.

Another not inconsiderable disadvantage of the conventional seat-heating system is the high temperature, under certain circumstances, at various points in locations of the male genital area, which can lead to fertility disturbances. The surface heating system in accordance with the invention does not basically produce excess temperatures, since, in fact, it can release heat over the entire surface and the corresponding site can be omitted or the heat reduced there.

Other experiments have shown that the heating behavior of the seat and back parts is approximately the same.

The superiority of the new surface heating system according to the invention, in comparison with the previous system with metal conductor wires, is indicated quite clearly from the experimental results. The surface heating system with the heating layer containing electrically conductive plastic heats more rapidly and consumes less current than the conventional seat heating system.

The invention thus creates a surface heating system that can release heat over the whole surface, which, even with a construction with a heating layer consisting of individual strips that under certain circumstances are at a distance from one another, can be guaranteed better than in the prior art, conforms, reversibly, to a pressure load on a substrate, such as a seat foam body, and does not lead to an accumulation of moisture or air when used.

In principle, the present invention is not limited to the heating of upholstered objects, but the uses of the surface heating system according to the invention is particularly preferred and advantageous as a seat or mattress heating system for or into/in one seat, especially vehicle seats, into/in a mattress, so that a separate patent is justified with this objective. The flexibility of the heating layer thereby has a special significance.

Figure 7:
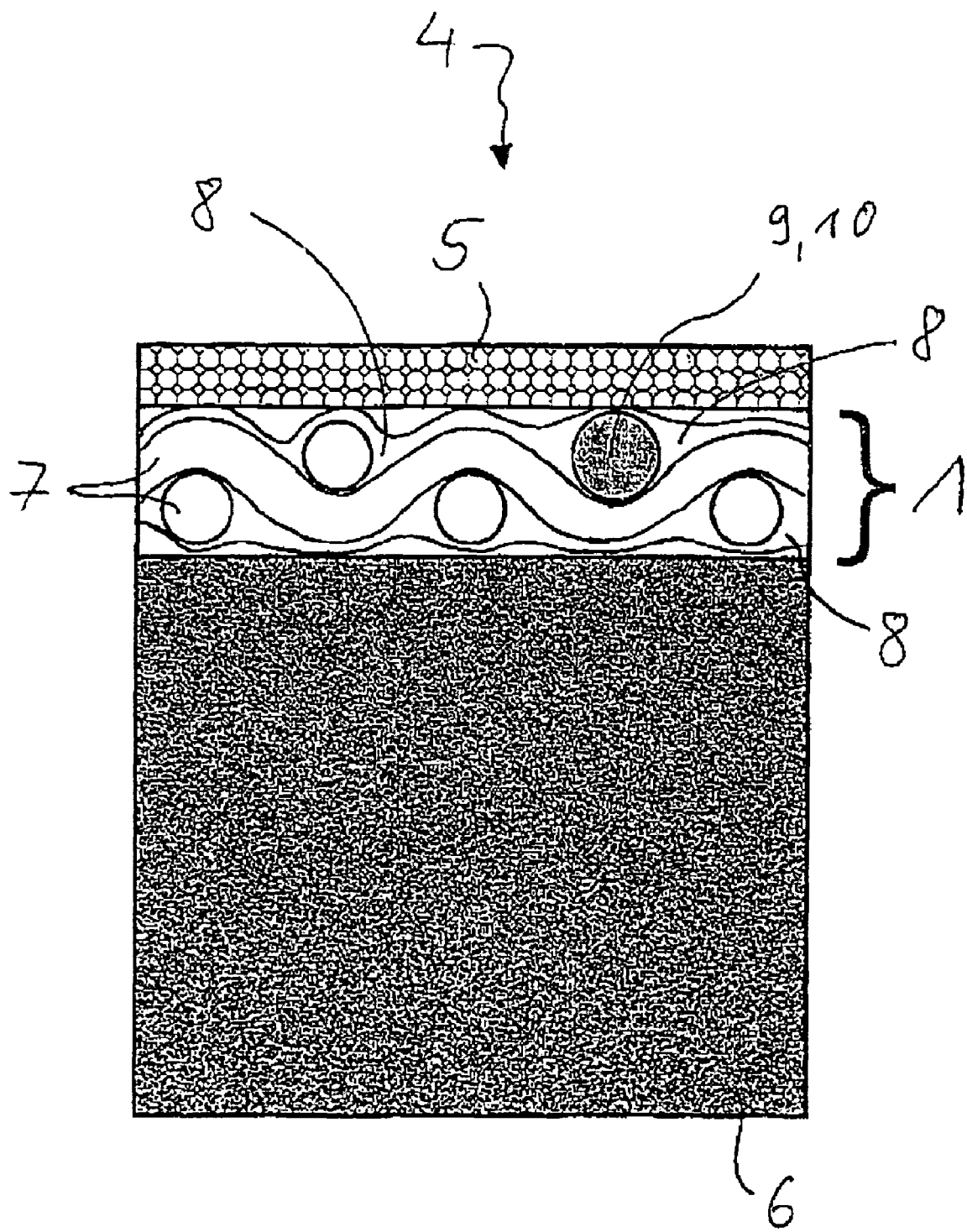
FIG. 7 shows an additional embodiment example of heating according to the invention in a schematic cross section, and FIG. 8 schematically depicts an embodiment example for seat occupancy recognition according to the present invention.

Another preferred configuration of the invention is explained in more detail below with the aid of the embodiment shown in FIG. 7, with reference to this drawing.

Analogously to FIGS. 1a and 1b, a part of a surface heating system 1 is shown, in section, that can be used as a seat heating system 4 as in FIGS. 2a and 2b. As a support 8, this surface heating system 1 comprises a polyester or polyamide fabric with, for example, a mesh size of ca. 5 mm—that is, a meshwork or grid in which adjacent, more or less parallel material strands are approximately 5 mm apart from each other. The structure of the support 8 and its material is not limited to the preceding specifications, but rather can be readily selected by specialists according to particular mechanical requirements. In other words, other materials or material combinations and thicknesses of the material strands and other mesh sizes can also be selected, depending on the application.

The support 8 is provided, by spraying, immersion, rolling, or in some other fashion, with a layer of electrically conductive plastic, in accordance with the present invention, also as indicated in the other documents. This means that the material strands of the polyester or polyamide fabric are completely surrounded or sheathed with the electrically conductive plastic which thus forms the heating layer 7.

As another special feature, current-carrying silver or copper wires are woven into the polyester or polyamide fabric—that is, into the support 8, for example, at a distance of 5 to 10 cm from one another, which form the contact ends 9 and 10 of power supply wires 11 and 12 in analogous fashion to the first embodiment according to FIGS. 1a and 1b. Since spraying, immersion, rolling or some other application (with) the layer made of electrically conductive plastic in accordance with the present invention also surrounds or sheathes the silver or copper wires—that is, the contact ends 9 and 10—with electrically conductive plastic, an optimal electrical contact between them is provided. The distance between the silver or copper wires serving as contact ends 9 and 10 of the power supply wires 11 and 12 is not limited to the indicated range of values, but rather can readily be selected by specialists according to particular mechanical and electrical requirements, In other words, other materials or material combinations and thicknesses of the contact ends 9 and 10 and other distances can be selected, depending on the application.

It is preferable, although not a limitation, that the contact ends 9 and 10—in the event that the surface heating system 1 is a seat heating system 4—run in particular approximately 90° to the direction of travel of a motor vehicle (not shown). Basically, however, the contact ends 9 and 10, in the form of the silver or copper wires, can run in any longitudinal or transverse direction.

A particularly preferred material composition for the heating layer 7, that is, for the electrically conductive plastic is as follows:
- 300 g rubber, which is used in production as granules, in the present case as a very fine dust;
- 300 g tetrahydrofuran;
- 165 g graphite; and
- 300 g of a polyurethane, such as and preferably, 4715 Lupranol from the BASF Company.

This produces a total quantity of 1065 g. For other quantities, the fractions should be calculated accordingly.

Preferably, fractions of the individual components of the material composition for the heating layer 7—that is, for the electrically conductive plastic—are as follows:
- ca. 20-35%, preferably about 25-30%, particularly preferably about 28% of a rubber or a material which is the same or acts similarly, in particular mechanically and/or electrically;
- ca. 20-35%, preferably and approximately 25-30%, particularly preferably about 28% tetrahydrofuran or a material which is the same or acts similarly, in particular mechanically and/or electrically;
- ca. 5-25%, preferably and approximately 10-20%, particularly preferably about 15% graphite or a material which, is the same or acts similarly, in particular mechanically and/or electrically; and
- ca. 20-35%, preferably and approximately 25-30%, particularly preferably about 28% of a polyurethane, such as and preferably 4715 Lupranol from the BASF Company or a material which is the same or acts similarly, in particular mechanically and/or electrically.

Another configuration possibility of the invention is also explained below. By measuring the change in power consumption of the heating layer 7, it is possible to implement seat occupancy recognition in a particularly simple and advantageous manner. This seat occupancy recognition functions both to determine whether anyone at all is sitting on the seat and also to determine, in particular, the weight of the occupant sitting on the seat. This aspect of the present invention is on the one hand particularly advantageous in connection with the surface heating system and on the other hand can also be used separately from it as only the seat occupancy recognition with a structure and features analogous to those disclosed for surface heating systems in all of the cited documents, with this seat occupancy recognition thus being worthy of a patent by itself alone, and optionally can be a component of separate patent applications and patents.

According to another aspect of the present invention, it concerns a seat occupancy recognition, a seat using it, as well as a seat occupancy recognition method. This aspect, in its individual embodiments, is disclosed here and is essential to the invention on its own and in combination with the first aspect of the invention, i.e., surface heating, the method for its production and the heatable object.

The core of the seat occupancy recognition is created by elements made of electrically conducting plastic in a seat. Preferably, for this purpose, elements made of electrically conducting plastic are accommodated in a seat cushion, and especially also the seat back, as well as preferably also the head supports. Strips of preferably electrically conducting PU, arranged especially at right angles to the direction of travel at stipulated spacings, are preferably involved.

It is particularly preferred if the material of these strips or general elements contain 50-70%, especially 55-60%, and preferably about 58% graphite, and 30-50%, especially 40-45%, preferably about 42% PU. It is also particularly preferred, if these strips or general elements are flexible, and especially expandable, and preferably permanently and reversibly expandable.

These elements, or especially strips, are part of a circuit. During expansion of the elements, or especially strips, their cross section changes, so that it is reduced. A cross-sectional change leads to a change of resistance in the form that, during a cross-section reduction of the electrically conducting elements, or especially strips, their electrical resistance diminishes when an electric current is passed through them. The change in electrical resistance can be detected and the corresponding information used for seat occupancy recognition. For this purpose, corresponding detection devices and processing devices are provided that are connected via appropriate signal lines.

According to a modification, the already explained cross-section reduction of the elements, and especially of strips made of electrically conducting plastic, for example, polyurethane, occurs as a function of load, i.e., the weight of a person sitting on a correspondingly equipped seat. Because of the latter embodiment, not only can the essential state of seat occupancy be recorded, but so can the weight of a person, at least in order of magnitude.

The load-related cross-section reduction of the elements, or especially strips, leads to an especially load-dependent change in their electrical resistance. Because of this change, on the one hand, seat occupancy can be recognized, in principle, and especially the weight of the person can be recorded according to the explained modification. The corresponding change in resistance is determined by a sensor or detector, whose output signal is conveyed to the processing and/or control device, which determines seat occupancy and, under some circumstances, the weight of the person, as a function of the output signal and the sensor, and again, as a function of this, controls additional devices in a vehicle, for example, airbag devices, belt-tighteners, seat and/or steering wheel adjustments, etc. The information of seat occupancy recognition is particularly advantageous in precisely controlling safety devices, such as an airbag, belt-tightener, and the like. It is also a particular advantage if the information from seat recognition is combined, for example, with seat position information, since optimal control of the safety devices can occur by the corresponding combination as a function of the size and weight of the occupant. Accordingly, the opening behavior of an airbag can occur in a manner adapted to the requirements of the occupants or passengers.

Figure 8:
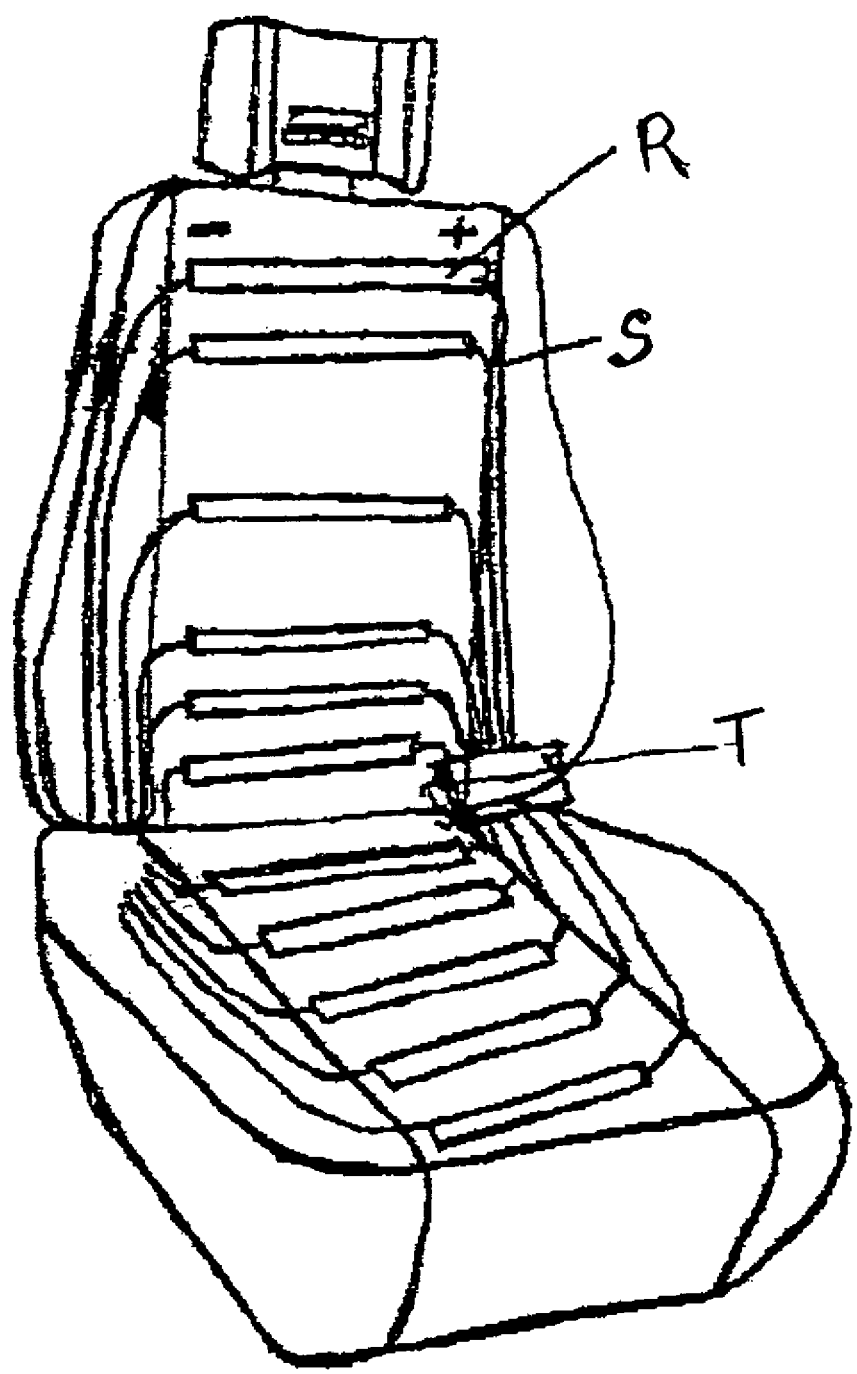

An embodiment example of seat occupancy recognition is schematically shown in FIG. 8, with reference to a vehicle seat equipped with it. A weight recognition seat occupancy mat is shown. R indicates measurement strips made of electrically conducting PU (polyurethane); S indicates that current passes through a built-in computer; and T indicates a built-in computer for evaluation.

Because of the aforementioned aspect of the present invention, a seat occupancy recognition, a seat using it, as well as a seat occupancy recognition method, are formed in particularly simple and reliable fashion. The expandability and flexibility of the material is then a particular advantage, so that the corresponding elements, and especially strips made of electrically conducting plastic, preferably polyurethane (PU), can not only adapt, in principle, to the corresponding occupant, but during use of the seat configured in this way, can execute any change dynamically. In particular, this means that not only is seat occupancy recognition technically implemented with it, but contact force measurement devices are also created, by means of which the pressure load on a seat, for example, of a vehicle, can be determined at any time from an occupant, as well as from the driving conditions. Consequently, information concerning the actual seat position and posture of an occupant, for example, "bent forward," as well as driving load situations, such as braking or acceleration, can therefore be determined at any time with the result of different pressure loads, for example, on the seat back, and recorded by an especially central processing and control module (built-in computer) and considered during control of other components, such as safety devices.

The corresponding features of the surface heating described above fully apply without restrictions for the layout, configuration and material composition of the seat occupancy recognition. To this extent, all details are referred to fully here, in order to avoid repetition in conjunction with the seat occupancy recognition.

The seat occupancy recognition, on the one hand, and the surface heating, on the other, as well as both in combination, which can be produced and implemented particularly advantageously by the same elements and therefore extremely cost effectively, can be produced, in particular, from the material compositions disclosed in the present documents. A preferred method is that a solvent is added to such a material composition so that the obtained formula can be applied, especially to a support layer or surface, by spraying, rolling, spreading or another process. During a reaction process after application, especially by increasing the temperature, a situation can be achieved in which the solvent volatilizes. Corresponding temperatures can be applied by infrared radiation in a heating furnace or other appropriate manner.

Another particularly preferred material composition for the heating layer 7 and/or the measurement strips is given below, which can be used with advantage, both in the surface heating according to the invention and in the seat occupancy recognition, and finally in a seat with such surface heating and/or with such seat occupancy recognition and fully belongs to the present invention.

According to this additional material composition, the percentages of the individual components for heating layer 7, i.e., for the electrically conducting plastic, are:

Rubber, or especially mechanically and/or electrically equivalent or similar material, as desired or required About 30-70%, preferably about 50% graphite or a mechanically and/or electrically identical or similarly acting material, and About 70-30%, preferably about 50% of an aqueous polyurethane binder, for example, and preferably Permutex RU-9012 or RU-4025 from Stahl Holland bv, Sluisweg 10, NL-5140 AA Waalswijk, Netherlands.

From the data sheets of Stahl Holland bv, Sluisweg 10, NL-5140 AA Waalswijk, Netherlands, the following material data are obtained:

Permutex RU-9012: 40% solid; aromatic type of polyether polyurethane; 100% modulus, 0.7 MPa; reactivation temperature 50-170° C.; wet lamination adhesive for general applications.

Permutex RU-9012: 35% solid; 8.5% cosolvent; aliphatic type; 100% modulus 1.3 MPa; elongation 675%; softening range 135-200° C.; good base binder for all types of soft surfaces; also for use as a dry adhesive for lamination of different types of plastic films; glues very well to pretreated polyolefins.

Experiments with such material compositions in different refinements have yielded excellent results, especially in comparison with ordinary variants, for surface heating, methods for its production and a heatable object, as well as seat occupancy recognition, a seat using it and seat occupancy recognition methods.

Another particularly preferred and advantageous embodiment of the surface heating according to the invention and/or the seat occupancy recognition is that the material composition of the heating layer 7, or the measurement strips, contains carbon fibers or even fully consists of them. The heating layer 7 or the measurement strips can consist of a mesh, knitted or woven fabric or can be produced with such carbon fibers. However, it can also be produced first from the carbon fibers with or without other material fractions, from which the heating layer 7 or the measurement strips are then woven, knitted or convoluted, in strip-like or broad surface fashion. With only 2 V power supply, an extremely rapid heating to about 60° C. can be achieved on a test strip.

The present invention therefore concerns, on the one hand, surface heating, a method for its production and a heatable object, as well as, on the other hand, a seat occupancy recognition, a seat using it and a seat occupancy recognition method, each individually and preferably in combination. A combination, in particular, is advantageous, since both basic aspects of the present invention can be used for implementation of the same physical devices.

The present invention was further explained above by means of embodiment examples; however, the invention is not restricted thereto. All modifications, combinations, variations and substitutions of the features explained above and depicted in the drawings are included within the area of expert knowledge of the present invention. All configuration possibilities that lie within the scope of the corresponding claims belong to the invention, in particular. The applications of the heating devices according to the invention are disclosed, in particular, and are optionally to be viewed as separately worthy of protection.

What is claimed is:

1. Surface heating with a supported heating layer, which contains electrically conducting plastic, wherein the heating layer is formed from a flexible film, and that the support is flexible, and wherein the material composition for the heating layer contains:
   about 30-70% graphite, and
   about 30-70% of an aqueous polyurethane binder.

2. Surface heating according to claim 1, wherein the support is a layer of one of a woven, nonwoven and mixed fabric.

3. Surface heating according to claim 1, wherein the heating layer contains polyurethane, single-component polyurethane, crosslinked single-component polyurethane, a PU foam, UV resistant and/or hydrolyzable or vapor permeable plastic material, and/or that the electrically conducting plastic of the heating layer contains graphite.

4. Surface heating according to claim 1, wherein the contact ends of current-supply wires in the heating layer or between the support and the heating layer are in contact with the heating layer.

5. Surface heating according to claim 4, wherein the contact ends of the current-supply wires are attached by means of the heating layer itself.

6. Surface heating according to claim 4, wherein the contact ends of the current-supply wires are stitched or glued to the heating layer and/or support.

7. Surface heating according to claim 1, wherein the heating layer is formed by one of spraying, rolling and spreading directly onto support.

8. Surface heating according to claim 1, wherein heating layer is one of glued, stitched and sealed onto the support.

9. Surface heating according to claim 1, wherein the support is a molded part from an elastic material.

10. Surface heating according to claim 9, wherein the molded part is one of a seat cushion of a seat surface part, a seat back and a cushion of one of a seat, couch and a mattress.

11. Surface heating according to claim 1, wherein one of a manually operable, electrically/electronically operable and am automatic current control is provided, which can be connected to a current source, and to which current-supply wires are connected, whose contact ends are in contact with the heating layer.

12. Surface heating according to claim 1, wherein the support is formed by a fabric that is one of a polyester and polyamide fabric and has a mesh size of about 5 mm.

13. Surface heating according to claim 12, wherein the contact ends of the current-supply wires are woven into the fabric and have a spacing of 5 to 10 cm and are formed from silver or copper wires.

14. Surface heating according to claim 12, wherein the support is provided with the heating layer by one of spraying, dipping, rolling or other coating technique, with a layer of electrically conducting plastic, so that the support and the contact ends are surrounded with the electrically conducting plastic.

15. Surface heating according to claim 1, wherein the heating layer contains rubber.

16. Surface heating according to claim 1, wherein the material composition for the heating layer contains carbon fibers.

17. Surface heating according to claim 1, wherein the heating layer includes predominately carbon fibers.

18. Surface heating according to claim 1, wherein one of a woven, nonwoven and knitted fabric is formed from the carbon fibers of the heating layer, in one of a strip like and flat configuration.

19. Surface heating according to claim 1, wherein threads are formed from the carbon fibers of the heating layer, from which one of a woven, nonwoven, knitted fabric and mesh is formed, in one of a strip like and flat configuration.

20. Heatable object, wherein the heatable object contains surface heating according to claim 1.

21. Heatable object according to claim 20, wherein the object is one of a seat surface part, a seat back, a cushion of a seat, a couch and a mattress, and that the heating layer is anatomically adapted to one of the thigh buttocks area and the back of a user.

22. Heatable object according to claim 21, wherein the heating layer is anatomically shaped in the plane of one of a seat surface part, a seat back, cushion of a seat, a couch and a mattress, in which it is present, according to one of anatomical specifications, and being electrically conducting.

23. Heatable object according to claim 21, wherein the heating layer has a corresponding thickness profile for anatomically adapted heat release.

24. Heatable object according to claim 20, wherein the object is a cushioned panel of a vehicle.

25. Heatable object according to claim 24, wherein the surface heating of the heatable object is arranged for different heat release over its surface.

26. Heatable object according to claim 20, wherein the heating layer is profiled with respect to one of its surface and thickness for different heat release over its surface.

27. Surface heating according to claim 2, wherein the support is a layer of a natural or synthetic nonwoven.

28. Surface heating according to claim 3, wherein the electrically conducting plastic of the heating layer contains graphite in powdered form.

29. Surface heating according to claim 1, wherein the material composition for the heating layer contains about 50% graphite.

30. Surface heating according to claim 1, wherein the material composition for the heating layer contains about 50% of an aqueous polyurethane binder.

* * * * *